(12) United States Patent
Mikhak

(10) Patent No.: US 7,149,474 B1
(45) Date of Patent: Dec. 12, 2006

(54) WIRELESS CABLE REPLACEMENT SYSTEM

(75) Inventor: Alahyar Alan Mikhak, Calabasas, CA (US)

(73) Assignee: Broadcom Corporation, Irvine, CA (US)

( * ) Notice: Subject to any disclaimer, the term of this patent is extended or adjusted under 35 U.S.C. 154(b) by 1143 days.

(21) Appl. No.: 09/706,360

(22) Filed: Nov. 2, 2000
(Under 37 CFR 1.47)

Related U.S. Application Data

(60) Provisional application No. 60/236,374, filed on Sep. 28, 2000, provisional application No. 60/236,222, filed on Sep. 28, 2000, provisional application No. 60/163,399, filed on Nov. 4, 1999, provisional application No. 60/163,171, filed on Nov. 2, 1999.

(51) Int. Cl.
*H04B 7/00* (2006.01)

(52) U.S. Cl. .................. 455/41.2; 455/424; 455/426.2; 455/557; 455/556.1; 370/259; 370/337

(58) Field of Classification Search ............... 455/41.2, 455/424, 445, 425, 500, 414.1, 426.2, 436, 455/426.1; 370/346, 466, 436, 401, 330, 370/337, 232; 375/222, 322, 133
See application file for complete search history.

(56) References Cited

U.S. PATENT DOCUMENTS

| | | | |
|---|---|---|---|
| 6,259,891 B1 * | 7/2001 | Allen ......................... 455/3.02 |
| 2002/0008145 A1 * | 1/2002 | Walsh et al. ........... 235/462.46 |
| 2002/0073254 A1 * | 6/2002 | Bertsch ...................... 710/100 |
| 2004/0057393 A1 * | 3/2004 | Bianchi et al. ............. 370/312 |
| 2004/0151212 A1 * | 8/2004 | Gerszberg et al. .......... 370/535 |
| 2004/0253924 A1 * | 12/2004 | Acampora ................. 455/41.2 |
| 2005/0164684 A1 * | 7/2005 | Chen et al. .............. 455/414.1 |
| 2006/0129656 A1 * | 6/2006 | Cianciarulo et al. ........ 709/217 |

FOREIGN PATENT DOCUMENTS

| EP | 0878936 | 11/1998 |
|---|---|---|
| WO | WO98/49850 | 11/1998 |
| WO | WO99/53680 | 10/1999 |

OTHER PUBLICATIONS

Haartsen J: "Bluetooth—The Universal Radio Interface for AD HOC, Wireless Connectivity" Ericsson Review, Ericsson, Stockholm, SE, No. 3, 1998, pp. 110-117, XP000783249 ISSN: 0014-0171.

* cited by examiner

*Primary Examiner*—Temica Beamer
*Assistant Examiner*—Joy Contee
(74) *Attorney, Agent, or Firm*—McAndrews, Held & Malloy, Ltd.

(57) ABSTRACT

A wireless cable replacement system. A personal area network, comprising a device having a first wireless transceiver, and an adapter having a second wireless transceiver in communication with the first wireless transceiver, and a plug capable of mating to a jack coupled to a local backbone.

82 Claims, 10 Drawing Sheets

WIRELESS CABLE REPLACEMENT SYSTEM

CROSS REFERENCE TO RELATED APPLICATIONS

This application claims the benefit of U.S. Provisional Patent Application No. 60/163,171, filed Nov. 2, 1999; U.S. Provisional Patent Application No. 60/163,399, filed Nov. 4, 1999; U.S. Provisional Patent Application No. 60/236,222, filed Sep. 28, 2000; and U.S. Provisional Patent Application No. 60/236,374, filed Sep. 28, 2000; the contents of which are hereby incorporated by reference.

BACKGROUND OF THE INVENTION

A local-area network (LAN) is a group of computing and telecommunications devices which are interconnected through a physical medium to facilitate the sharing of applications, data and peripherals. Local-area networks are generally confined to a single building. Ethernet is an exemplary local-area network which has enjoyed considerable success in the office environment. Typically, an Ethernet includes a local backbone with any number of access points to connect the computing and telecommunications devices. Each of these devices are wired to an access point using a coaxial cable that plugs into an Ethernet jack. The use of these cables to interconnect the computing and telecommunications devices is costly and labor intense. Accordingly, it would be desirable to connect a wide range of devices to a local area network easily and simply, without the need to purchase, store or connect cables. A wireless solution that readily interfaces with existing devices and local-area networks infrastructure would also be very convenient.

SUMMARY OF THE INVENTION

In one aspect of the present invention, a personal area network includes a device having a first wireless transceiver, and an adapter having a second wireless transceiver in communication with the first wireless transceiver, and a plug capable of mating to a jack coupled to a local backbone.

In another aspect of the present invention, a method of communication includes exchanging information over a wireless medium between a device and an adapter having a plug mated to a jack coupled to a local backbone, and communicating at least a portion of the information between the adapter and the local backbone.

In yet another aspect of the present invention, a personal area network includes a device having a first complementary metal-oxide semiconductor (CMOS) wireless transceiver, and an adapter having a second CMOS wireless transceiver in communication with the first CMOS wireless transceiver, and an interface to interface the second CMOS wireless transceiver to the local backbone.

In still another aspect of the present invention, a wall dongle includes a plug capable of mating to a jack coupled to a local backbone, an interface coupled to the plug, and a wireless transceiver coupled to the interface.

In a further aspect of the present invention, a method of interfacing a wireless communication medium to a local backbone includes using a wall dongle to exchange information with an external device over a wireless medium, the wall dongle having an adapter plugged into a jack coupled to a local backbone, and communicating at least a portion of the information between the wall dongle adapter and the local backbone.

In yet a further aspect of the present invention, a device dongle includes a plug capable of mating to a jack coupled to a device, an interface coupled to the plug, and a wireless transceiver coupled to the interface.

In still a further aspect of the present invention, a method of interfacing a wireless communication medium to a device includes using a device dongle to exchange information with an external device over a wireless medium, the device dongle having an adapter plugged into a jack coupled to the device, and communicating at least a portion of the information between the device dongle and the device.

In another aspect of the present invention, a communications network includes a device having a first wireless transceiver, a second wireless transceiver in communication with the first wireless transceiver, a local backbone coupled to the second wireless transceiver, and an Internet gateway coupled to the local backbone.

In yet another aspect of the present invention, a communications network includes a plurality of devices each having a wireless transceiver, a local backbone, an access point to the local backbone, the access point having an access wireless transceiver in communication with the wireless transceiver for each of the devices, and an Internet gateway coupled to the local backbone.

In still another aspect of the present invention, a method of communication includes exchanging information over a wireless medium between a device and an access point to a local backbone, communicating at least a portion of the information between the access point and the local backbone, and coupling the communicated information between the local backbone and an Internet gateway.

It is understood that other embodiments of the present invention will become readily apparent to those skilled in the art from the following detailed description, wherein it is shown and described only embodiments of the invention by way of illustration of the best modes contemplated for carrying out the invention. As will be realized, the invention is capable of other and different embodiments and its several details are capable of modification in various other respects, all without departing from the spirit and scope of the present invention. Accordingly, the drawings and detailed description are to be regarded as illustrative in nature and not as restrictive.

DESCRIPTION OF THE DRAWINGS

These and other features and advantages of the present invention will be better understood from the following detailed description read in light of the accompanying drawings, wherein.

Like reference numerals are used to designate like parts in the accompanying drawings.

DETAILED DESCRIPTION OF THE INVENTION

Figure 1:
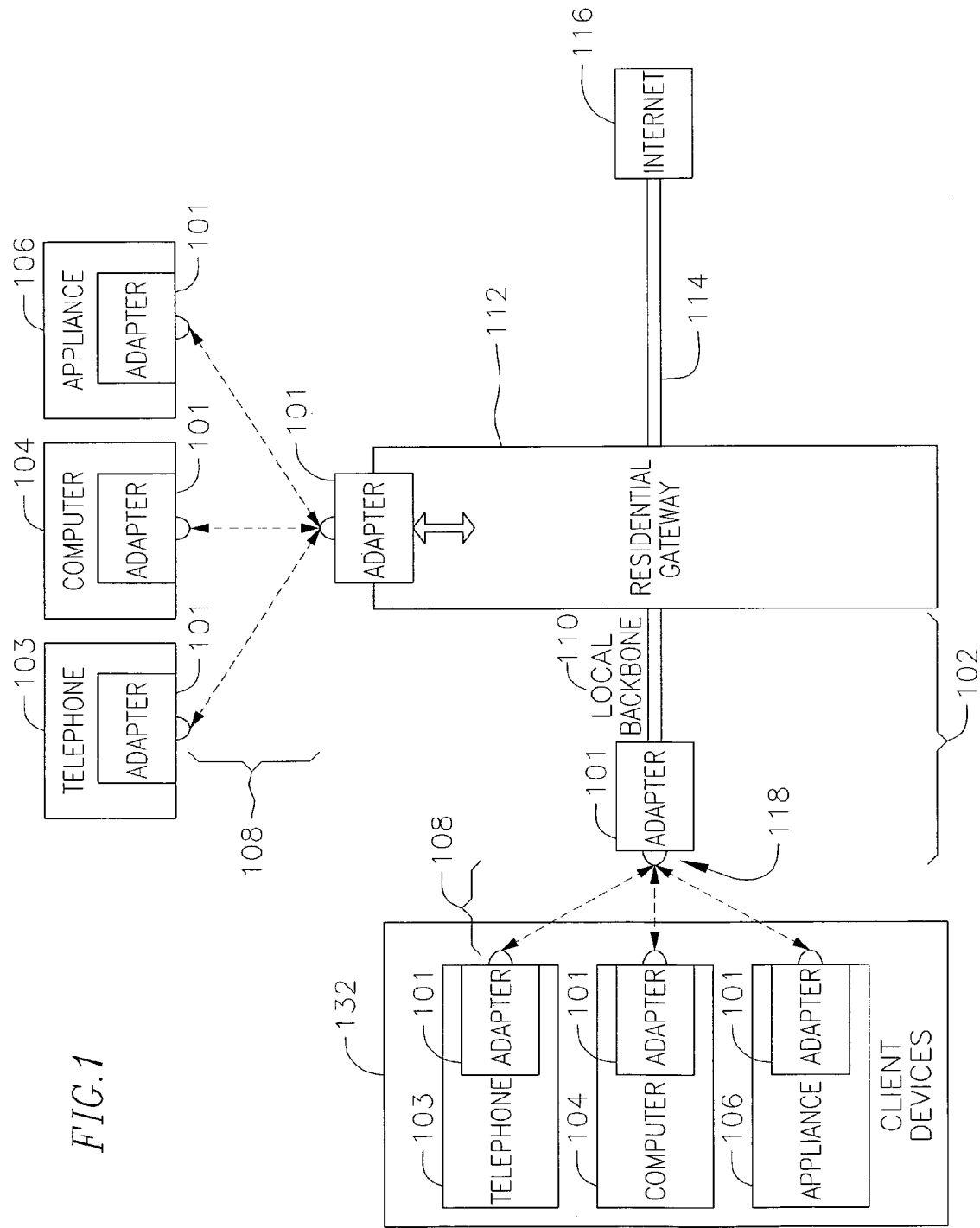
FIG. 1 is a block diagram of a cable replacement system utilized in a LAN and coupled to an Internet via a gateway.

A wireless cable replacement system is typically utilized in a networked environment. The cable replacement system allows wiring to be replaced with more flexible connectivity as supplied via one or more wireless links. A typical environment where a wireless cable replacement system would be utilized includes a home network, or a local area network (LAN). Home networks are typically utilized to allow appliances, computers, telephones, televisions and other devices equipped with suitable interfaces to communicate throughout the home and to an external Internet. A LAN typically interconnects, or networks, business equipment such as faxes, telephones, and computers together and to an external Internet. Typical communications protocols include HPNA in a home environment and ethernet in a business environment.

Integration of the various devices being networked is typically accomplished in a gateway device. The gateway provides signal processing to allow data from the various devices coupled to a backbone to be packetized in a suitable format for transmission over an Intranet and/or an Internet. Processing of a signal for transmission is typically implemented in a layered structure as is known to those skilled in the art. In particular digital signal processing (DSP) methods are utilized to allow multiple devices to communicate over a packet based network through the layered structure.

A gateway provides an interface in the architecture of a packetized data transmission system between networks having differing characteristics. The embodiments of a wireless cable replacement are applicable to any type of network separated by one or more gateways, including residential gateways or other types of gateways known to those skilled in the art. A residential gateway is typically a gateway that is suitable for use in interfacing a home or office network typically utilizing telephone circuits for Intranet interconnections to an Intranet, typically utilizing a cable television (CATV) network, or public switched telephone network (PSTN) via a digital subscriber line (DSL) to access an Internet.

In the exemplary residential gateway DSP techniques are utilized to allow multiple channel of data supplied by differing devices such as computers, appliances and telephones present on the Internet to be individually packetized and transferred between networks such as an Internet and Intranet.

Special packetization procedures are typically utilized to allow for the various communication capabilities of the coupled devices and the transmission capabilities of the wiring in the Intranet. The telephone wiring typically found in a home and utilized in an Intranet, or home network, is not an optimum way to transfer data. Signal processing that effectively accommodates the characteristics of the wired network coupled to is typically present in the hardware and software of the particular gateway.

Gateway functions, including residential gateway functions, are provided in a variety of hardware configurations including a personal computer, a set top box or the exemplary set top box that is described in the following paragraphs.

FIG. 1 is a block diagram of a cable replacement system utilized in a LAN 102 and coupled to an Internet 116 via a gateway 112. An embodiment of the present invention is directed to a system and technique to deliver services in the home using existing wire pairs, and wireless cable replacement systems already installed in the home all while not disrupting existing services provided on the existing wire pair.

A series of adapters 101 are provided to establish a wireless link through a wireless medium such as RF or infrared 108. Adapters present in the client devices 132, and coupled to a local backbone 110 make up a portion of the wireless cable replacement system. The local backbone includes all of the wiring interconnecting the individual client devices 132 to a main wiring bus emanating from the residential gateway.

In addition an adapter is shown as part of the residential gateway 112. This embodiment couples signals from the bus of a cable modem MAC (not shown) included in the residential gateway to the adapter.

A residential gateway may be installed at a location inside or outside the home. The residential gateway accepts inputs from an IP network on one side that is capable of delivering IP (Internet Protocol) services to the home. The other side of the residential gateway 112 can be the interface to the in home wiring that previously delivered POTS. The exemplary embodiment shown in FIG. 1 has two wire pairs, one pair continues to deliver POTS the other wire pair delivers POTS and other services to a local area network (LAN).

The residential gateway provides a means to convert the physical media and protocols used for the IP network to the physical media and protocols (typically HomePNA) used on the in home wire pairs. The in home wire pairs that couple client devices 132 to the residential gateway 112 are termed a local backbone 110. In alternative embodiments the residential gateway provides a means to convert the physical media and protocols used for the IP network to the physical media and protocols used on the LAN backbone (typically Ethernet, ADSL and IDSL) In the described exemplary embodiment, a DOCSIS (Data Over Cable Service Interface Specification) network is used for delivery of IP services over the IP network (an HFC network coupled to a CATV network). A consequence of this choice is that the residential gateway includes a cable modem. In alternative embodiments a modem may be provided that is coupled to the PSTN via digital subscriber line technology.

The described exemplary embodiment uses two well-known protocols for delivery of in home services. The first protocol is a base band protocol to deliver POTS. This protocol is described by Bellcore (now Telcordia) in TR-NWT-000057. The second protocol is HomePNA (Home Phoneline Network Alliance) as described in the Version 2.0 specification.

The function of the residential gateway can be divided into three components along service delivery lines. The first is delivery of broadband data services. This function is the primary function of the cable modem as described by the CableLabs DOCSIS specification. Data service is delivered using Ethernet as specified by CableLabs in the DOCSIS specification, and alternatively by HPNA.

The second function is the POTS interface. The gateway contains the high voltage circuits and the processing elements necessary to convert packetized voice delivered over IP streams to the continuous analog voltages required for the POTS interface.

The third function is a proxy for the voice over HPNA phones 103 connected to the HPNA network 102. The Proxy performs an interface conversion function at two levels, first is a transport packet conversion and the second is the signaling protocol conversion.

Two POTS phones are shown 103. Both of these are traditional telephones connected to the residential gateway for telephone service. As described above, for installations where only a single wire pair is available in the home as a local backbone, only one phone line is used, that would be the phone attached to the HomePNA network. Not shown in this drawing is the possibility of bridging additional POTS telephones on the wire pair, or local backbone 110. In this system, these bridged phones will behave as a bridged phone on a traditional POTS line. All bridged telephones are assigned to the same phone number and the ring/dial tone behavior is as described in TR-NWT-000057.

Home appliance control is represented by an appliance block 106. The concept here is to allow appliance controllers on the network to access control information for connected client devices 132. For example, a connected personal computer 104 might control the start time for an appliance 106, such as a coffee maker.

Another possible client device 132, is a connected printer device. This can be any type of computer peripheral that permits resource sharing from any of multiple personal computers or other control devices connected to the Home-PNA network.

The HomePNA phone 103 shown is a telephone that integrates the function of the HomePNA adapter and the telephone. This phone looks and works just like any traditional telephone, the difference is that it uses the HPNA interface to accomplish the voice transport and signaling functions instead of the POTS interface.

Also shown is the connection of two personal computers 104 running application software such as Netscape. Any application can be substituted here, the important feature of these applications is that they connect to the world wide net 116 (or Internet) through the residential gateway 112.

An additional appliance 106 that may be connected to the HomePNA network is a television. This can be used to display television programming streamed from the external IP network or spooled from memory systems of an attached video server. This video server could be a dedicated device for this purpose or specialized programming on one of the attached personal computers.

A cable modem provides an access point for a home network or Intranet to an Internet via a CATV connection. Equivalently a DSL capable modem supplies the capabilities for coupling a home network, or Intranet to an Internet via a DSL line and the PSTN. Those skilled in the art will realize that any number of gateway configurations may be utilized in a system utilizing a wireless cable replacement system. In particular a cable modem utilized as a gateway processes packetized data for transmittal over the CATV network in compliance with a transmission standard known as DOCSIS.

Figure 2:
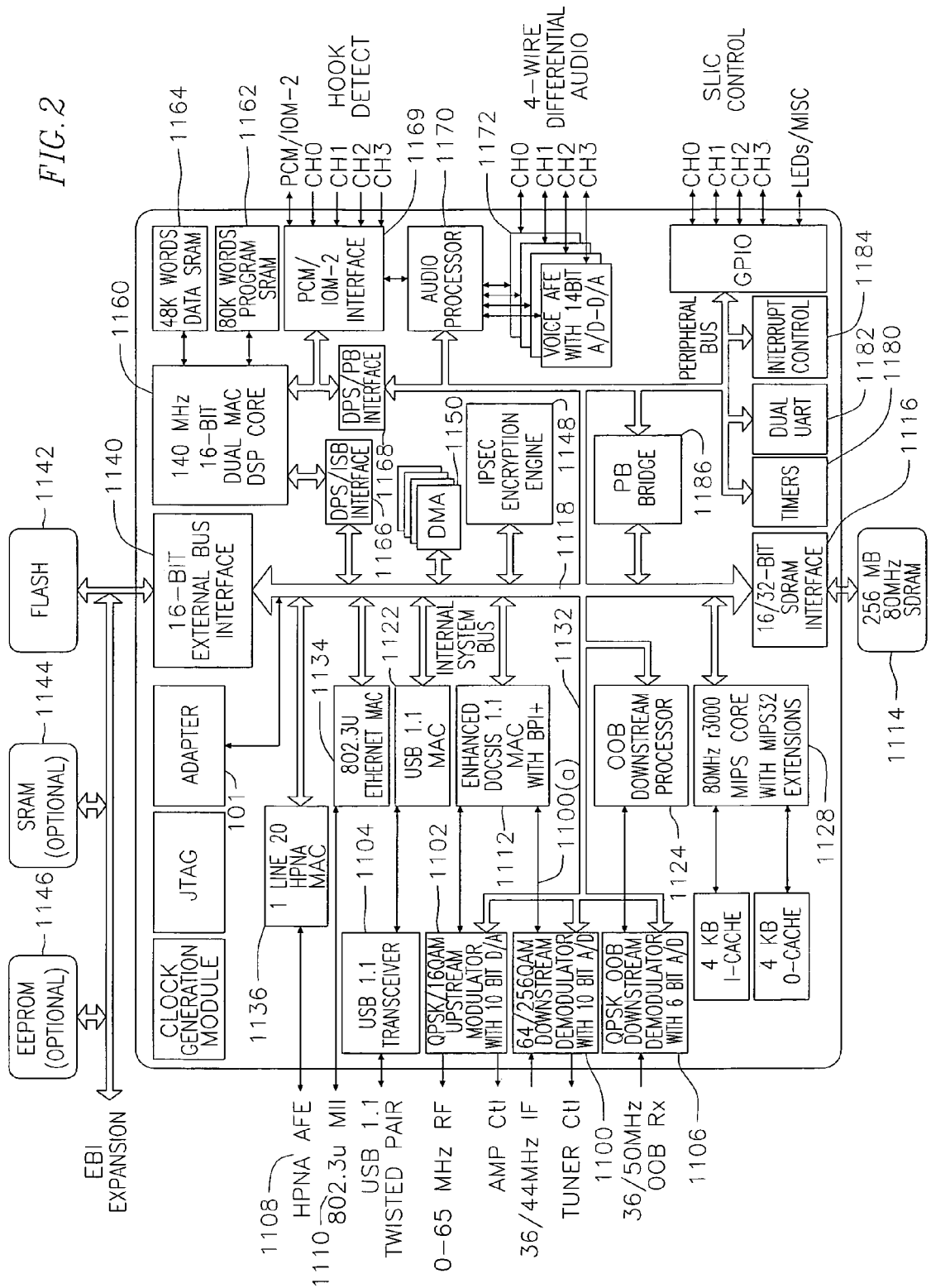
FIG. 2 is a block diagram of an exemplary embodiment of a DOCSIS compliant cable modem utilized as a residential gateway.

FIG. 2 is a block diagram of an exemplary embodiment of a DOCSIS compliant cable modem utilized as a residential gateway. The gateway includes adapter circuitry 101 that is coupled to the cable modem MAC 1112. The described exemplary embodiment may provide a highly integrated solution implemented single chip that is compliant with the (DOCSIS). DOCSIS was developed to ensure that cable modem equipment built by a variety of manufacturers is compatible, as is the case with traditional dial-up modems. The described exemplary embodiment can provide integrated functions for communicating with the CMTS. For example, a QPSK upstream modulator 1102 transmits data to the far end data terminating device, a QAM downstream demodulator 1100 receives data from the far end data terminating device via a CMTS, and a QPSK out of band downstream demodulator 1106 receives out of band MPEG-2 encoded messages from the CMTS.

In addition, the described exemplary embodiment can support multiple inputs in accordance with a variety of protocols. For example, a universal serial bus transceiver 1104 provides transparent bi-directional IP traffic between devices operating on a USB such as for example a PC workstation, server printer or other similar devices and the far end data terminating device. Additionally, an I.E.E.E. 802.3 compliant media independent interface (MII) 110 in conjunction with an Ethernet MAC 1134 also provide bi-directional data exchange between devices such as, for example a number of PCs and or Ethernet phones and the far end data terminating device. A voice and data processor 1160 is used for processing and exchanging voice, as well as fax and modem data between packet based networks and telephony devices.

The QAM downstream demodulator 1100 may utilize either 64 QAM or 256 QAM in the 54 to 860 MHZ bandwidth to interface with the CMTS. The QAM downstream demodulator 1100 accepts an analog signal centered at the standard television IF frequencies, amplifies and digitizes the signal with an integrated programable gain amplifier and A/D converter. The digitized signal is demodulated with recovered clock and carrier timing. Matched filters and then adaptive filters remove multi-path propagation effects and narrowband co-channel interference. Soft decisions are then passed off to an ITU-T J.83 Annex A/B/C compatible decoder. The integrated decoder performs error correction and forwards the processed received data, in either parallel or serial MPEG-2 format to a DOCSIS Media Access Controller (MAC) 1112.

The output of the downstream demodulator 1100 is coupled to the DOCSIS MAC 1112. The DOCSIS MAC 1112 may include baseline privacy encryption and decryption as well as robust frame acquisition and multiplexing with MPEG2-TS compliant video and audio streams. The DOCSIS MAC 1112 implements the downstream portions of the DOCSIS protocol. The DOCSIS MAC 1112 extracts DOCSIS MAC frames from MPEG-2 frames, processes MAC headers, and filters and processes messages and data.

Downstream data packets and message packets may be then placed in system memory 1114 by a SDRAM interface 1116 via the internal system bus 1118. The SDRAM interface 1116 preferably interfaces to a number of off the shelf SDRAMs which are provided to support the high bandwidth requirements of the Ethernet MAC 1112 and other peripherals. The SDRAM interface 1116 may support multiple combinations of 8, 116 or 32 bit wide SDRAMs, allowing for external data storage in the range of about 2 to 32 MBytes. The DOCSIS MAC 1112 includes a number of direct memory access (DMA) channels for fast data access to and from the system memory 1114 via the internal system bus 1118.

The upstream modulator 1102 provides an interface with the CMTS. The upstream modulator 1102 may be configured to operate with numerous modulation schemes including QPSK and 16-QAM. The upstream modulator 1102 supports bursts or continuous data, provides forward error correction (FEC) encoding and pre-equalization, filters and modulates the data stream and provides a direct 0–65 MHZ analog output.

The DOCSIS MAC 1112 can also implement the upstream portions of the DOCSIS protocol before transmission by the upstream modulator 1102. The DOCSIS MAC 1112 receives data from one of the DMA channels, requests bandwidth and frames the data for TDMA with other modems on the same upstream frequency.

The DOCSIS MAC interfaces with the MIPS core 1128 via the ISB 1118. An exemplary embodiment of the MIPS core 1128 includes a high performance CPU operating at a speed of at least 80 MHZ with 32-bit address and data paths. The MIPS core includes two way set associative instruction and data caches on the order of about 4 kbytes each. The MIPS core 1128 can provide standard EJTAG support with debug mode, run control, single step and software breakpoint instruction as well as additional optional EJTAG features.

The upstream modulator 1102 and the downstream demodulator 1100 are controlled by the MIPS core 1128 via a serial interface which is compatible with a subset of the Motorola M-Bus and the Philips 12C bus. The interface consists of two signals, serial data (SDA) and serial clock (SCL), which may control a plurality of devices on a common bus. The addressing of the different devices may be accomplished in accordance with an established protocol on the two wire interface.

The described exemplary embodiment of the network gateway includes a full-speed universal serial bus (USB) transceiver 1104 and USB MAC 1122 which is compliant with the USB 1.1 specification. The USB MAC 1122 provide concurrent operation of control, bulk, isochronous and interrupt endpoints. The USB MAC 1122 also can support standard USB commands as well as class/vendor specific commands. The USB MAC 1122 include integrated RAM which allows flexible configuration of the device. Two way communication of information to a device operating on a USB can be provided, such as for example a PC on a USB 1.1 compliant twisted pair. The USB MAC 1122 can be arranged for hardware fragmentation of higher layer packets from USB packets with automatic generation and detection of zero length USB packets. The USB MAC 1122 may include DMA channels which are used to communicate received data to the system memory 1114 via the internal system bus 1118. Data stored in system memory 1114 may then be processed and communicated to the cable modem termination system (not shown) via the DOCSIS MAC 1112 and the upstream modulator 1102. Similarly data received from the cable modem termination system and processed by the downstream demodulator 1100 and stored in system memory as higher layer packets can be retrieved by the USB MAC1122 via the ISB 1118 and assembled into USB packets with automatic generation of zero length USB packets. USB packets may then be communicated to the external device operating on the USB via the USB transceiver 1104.

A media independent interface (MII) 1110 can provide bi-directional communication with devices such as for example a personal computer (PC) operating on an Ethernet. The media independent interface 1110 can forward data to and receive information from the Ethernet MAC 1134. The Ethernet MAC 1134 can also perform all the physical layer interface (PHY) functions for 100BASE-TX full duplex or half-duplex Ethernet as well as 10BBASE-T full or half duplex. The Ethernet MAC 1134 can also decode the received data in accordance with a variety of standards such as for example 4B5b, MLT3, and Manchester decoding. The Ethernet MAC can perform clock and data recovery, stream cipher de-scrambling, and digital adaptive equalization. The Ethernet MAC 1134 may include DMA channels which are used for fast data communication of processed data to the system memory 1114 via the internal system bus 1118. Processed data stored in system memory 1114 may then be communicated to the cable modem termination system (not shown) via the upstream modulator 1102. Similarly, data received from the cable modem termination system is processed by the downstream demodulator 1100 and stored in system memory as higher layer packets which can then be retrieved by the Ethernet MAC 1134 via the ISB 1118 and encoded into Ethernet packets for communication to the external device operating on the Ethernet via the MII 1110. The Ethernet MAC 1134 may also perform additional management functions such as link integrity monitoring, etc.

In addition to the SDRAM interface 1116, the described exemplary embodiment of the gateway includes a 16-bit external bus interface (EBI) 1140 that supports connection to flash memories 1142, external SRAM 1144 or EPROMS 1146. Additionally, the EBI 1140 may be used to interface the described exemplary network gateway with additional external peripherals. The EBI 1140 can provide a 24 bit address bus and a 16-bit bi-directional data bus. Separate read and write strobes can be provided along with multiple firmware configurable chip select signals. Each chip select can be fully programmable, supporting block sizes between about 4 K-bytes and 8 M-bytes, extended clock cycle access control and 8 or 16-bit selection of peripheral data bus width. In the described embodiment, the EBI 1140 can support both synchronous and asynchronous transfers. Pseudonymous transfers may be supported through the use of read/write strobes to indicate the start and duration of a transfer. The EBI 1140 can include DMA access capability to or from the SDRAM interface 1116. The DMA operation may take one or more forms. For example, in EBI mode, an EBI bridge can act as the DMA controller, and perform all pointer and buffer management tasks during DMA operations. In an external mode, an external device can act as the DMA controller and the EBI 1140 can serve as a simple bridge. In DMA mode the MIPS core 1128 can be responsible for DMA setup.

The network gateway may be vulnerable to network breaches due to peripheral devices such as PC employing windows or network Macintosh computers. These operating systems include "file sharing" and "printer sharing" which allow two or more networked computers in a home or office to share files and printers. Therefore the exemplary embodiment of the gateway includes IP security module 1148 which interfaces with ISB 1118. The MIPS core 1128 can set-up and maintain all security associations. The MIPS core 1128 can also filter all IP traffic and route any messages requiring security processing to the security module via the ISB 1118. The security module 150 may support single DES (CBC and ECB modes) triple DES (CBC and ECB modes) MD-5 and SHA authentication in hardware to provide support for virtual private networks.

The security module 1148 can implement the basic building blocks of the developing IP Security Standard (IPsec). The security module 1148 may also be used to implement any other security scheme that uses the same basic blocks as IPsec, which uses two protocols to provide traffic security. A first protocol, IP Encapsulating Security Payload (ESP), provides private data privacy with encryption and limited traffic flow confidentiality. ESP may also provide connection less integrity, data source authentication and an anti-replay service. A second format, IP Authentication Header (AH), provides connection less integrity, data source authentication and an optical anti-replay service. Both protocols may be used to provide access based on the distribution of cryptographic keys and the management of traffic flows. The protocols may be used alone or in combination to satisfy the security requirements of a particular system. In addition, the security module 1148 can support multiple modes of operation depending on a security association to the traffic carried by a simplex connection. For example, transport mode security association between two hosts, primarily protects protocols above the IP layer while tunnel mode security association provides security and control to a tunnel of IP packets.

The exemplary security module 1148 addresses possible differences in packet format between IPsec and future security applications with a generalized scheme to determine where the authentication/encryption algorithms are applied with a data packet. The authentication/encryption algorithms consider each packet to consists of three parts, a header, body and trailer. The appropriate algorithm can be applied, using any specified parameters to the body section only.

In an encryption mode, the security module 1148 can add and initialize any necessary headers, determine necessary parameters, generate the associated control message and add the control and data message. In the authentication mode, the control fields of the received data packets are parsed, the parameters are determined via a security association lookup table, control message is created and the control and data messages are queued.

The exemplary embodiment of the network gateway includes a DMA controller 1150 having a number of channels that enable direct access over the ISB 1118 between peripherals and the system memory 1114. With the exception of the security module 1148, packets received by the network gateway 98 cause DMA transfers from a peripheral to memory, which is referred to as a receive operation. A DMA transfer from memory to a peripheral is referred to as a transmit operation. Programmable features in each channel can allow DMA controller 1150 to manage maximum ISB burst lengths for each channel, enable interrupts, halt operation in each channel, and save power when certain modules are not operational. The maximum ISB burst length may be programmed independently for each channel preferably up to 64 32 bit words. Each channel can include maskable interrupts connected to the MIPS core 1128 which indicate buffer complete, packet complete and or invalid descriptor detected. Busy DMA channels may be stalled or completely disabled by the MIPS core 1128. Source clocks (not shown) for each channel are can be connected to the channels based on the internal peripheral they service. For power reduction, these clocks may be turned off and on coincident with the respective peripheral's clock.

The DMA controller 1150 can be operable in both non-chaining and chaining mode. In the non-chaining mode the DMA channel refers to its internal registers for the pertinent information related to a scheduled DMA burst transfer. The DMA controller can set-up the buffer start address, byte count, and status word registers before initiating the DMA channel for each allocated buffer. In the transmit direction, the DMA channels can send the specified number of bytes (preferably up to 4095) from the specified byte address. In the receive direction, the DMA channels can insert data into a specified memory location until a buffer has been completely filled or the end of a packet is detected.

In the chaining mode, the system memory can be partitioned, preferably using descriptor rings containing pointers to memory buffers as well as status information for each memory buffer. The MIPS core 1128 can write the descriptor pointers while the DMA controller 1150 follows by inserting/taking data into/from the location designated by the descriptor. Upon completion of the transfer of a buffer, the DMA controller 1150 effectively clears the descriptor by updating the status to indicate that the data has been inserted/taken. Specific information may be added to the descriptor to indicate the length of data in the block, specifying whether the data is the first or last block of a packet, etc.

In the downstream direction, the MIPS core 1128 can fill or recognize a data block for a particular DMA channel, then write the next unused descriptor in the ring indicating that the block is filled and where the downstream data exists in memory. The DMA controller 1150 can follow the DSP write to the descriptor ring, sending out data and clearing the descriptor when the transfer is complete. When the DMA controller 1150 reads a descriptor that does not contain valid data, it can go idle until initiated by the DSP core.

In the upstream direction, the MIPS core 1128, can allocate memory space for incoming data, then write the descriptor with the start address for that buffer. The DMA controller 1150 reads the base address and inserts data until either the buffer is full or an end of packet has been detected. The DMA controller 1150 can update the descriptor, communicating to the MIPS core 1128 that the block is full, indicating the length of the data on the block, and/or asserted first and or last buffer flags.

The described exemplary network gateway can include a voice processor 1160 for processing and transporting voice over packet based networks such as PCs running network on a USB (Universal Serial Bus) or an asynchronous serial interface, Local Area Networks (LAN) such as Ethernet, Wide Area Networks (WAN) such as Internet Protocol (IP), Frame Relay (FR), Asynchronous Transfer Mode (ATM), Public Digital Cellular Network such as TDMA (IS-13x), CDMA (IS-9x) or GSM for terrestrial wireless applications, or any other packet based system. The described embodiment of the voice processor 1160 also supports the exchange of voice, as well as fax and modem, between a traditional circuit switched network or any number of telephony devices and the CMTS (not shown). The voice processor may be implemented with a variety of technologies including, by way of example, embedded communications software that enables transmission of voice over packet based networks.

The described exemplary embodiment of the cable modem acting as a network gateway includes integrated peripherals including independent periodic interval timers 1180, a dual universal asynchronous receiver-transmitter (UART) 1182 that handles asynchronous serial communication, a number of internal interrupt sources 1184, and a GPIO module 1186 that provides multiple individually configurable input/output ports. In addition, multiple GPIO ports can be provided to drive various light emitting diodes (LEDs) and to control a number of external SLICs. A peripheral bus bridge 1186 can be used to interface the low speed peripheral to the internal system bus 1118.

The described exemplary embodiment also includes an HPNA MAC (not shown) which provides an interface between the HomePNA network and the MIPS processor.

The embodiment presented is described in more detail in co-pending U.S. Application entitled "Gateway with Voice," filed Apr. 13, 2000, U.S. Patent Application No. 60/129,134. The disclosure thereof is incorporated herein in its entirety by reference.

Figure 3:
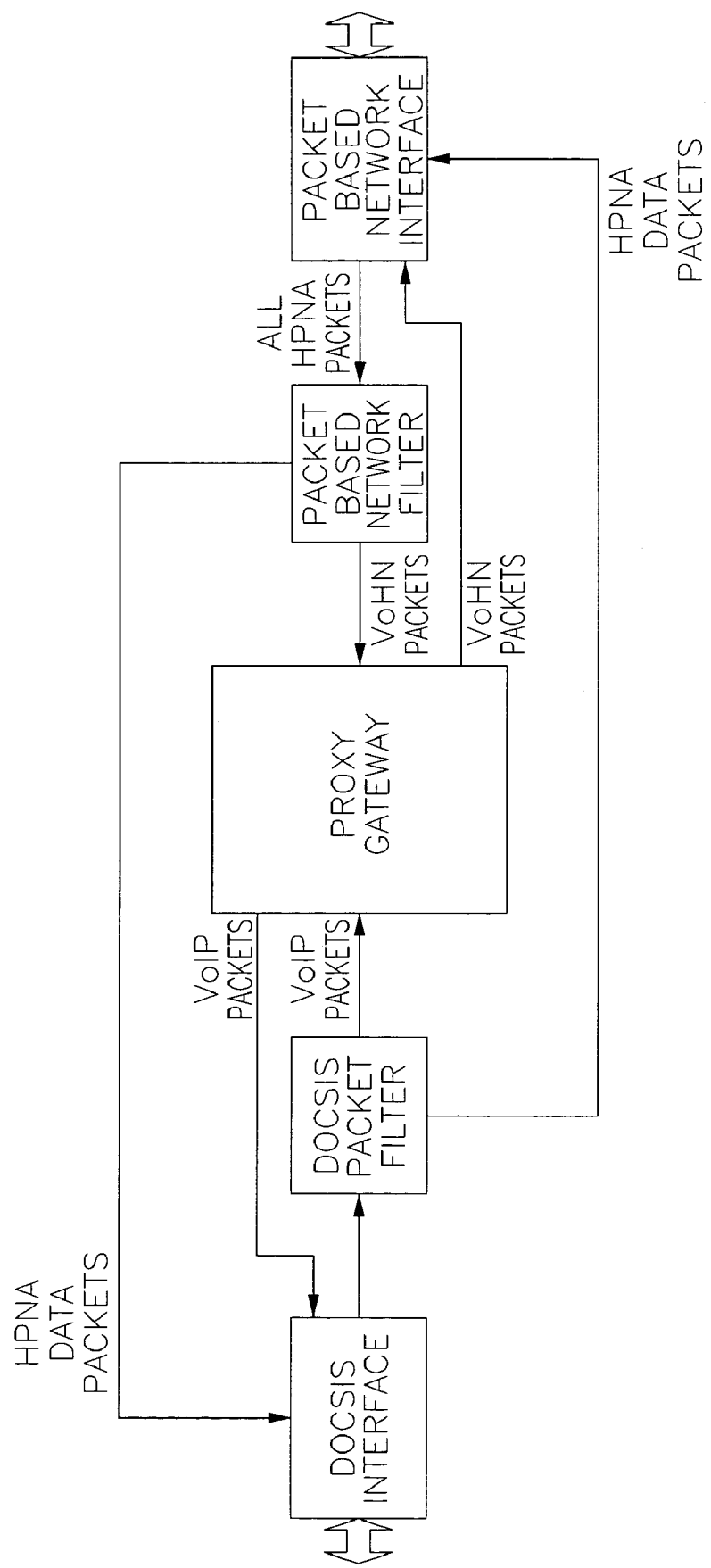
FIG. 3 presents a data flow diagram that describes the flow of transport packets in the residential gateway.

FIG. 3 presents a data flow diagram that describes the flow of transport packets in the residential gateway previously described. The DOCSIS Interface is the primary interface to the DOCSIS network within the residential gateway. All packets that arrive to or leave from the residential gateway via the DOCSIS network must go through the DOCSIS interface block. As shown all packets arriving from the DOCSIS network go through the DOCSIS interface block and are delivered to the packet based network filter. The DOCSIS interface block translates the packet format as represented in the DOCSIS network to an internal format that is used for all packet filter and routing functions within the residential gateway.

The DOCSIS packet filter accepts packets from the DOCSIS interface and makes a routing decision based on the destination address within the packet. The destination of the packet will be one of three possibilities: (1) VoIP Packets for the proxy gateway, (2) VoIP packets for the telephony interface controller or (3) data packets delivered directly to the packet based network interface.

The packet based network interface is the primary interface to the packet based network within the residential gateway. All packets that arrive to or leave from the residential gateway via the packet based network must go through the packet based network interface block. As shown all packets arriving from the packet based network go through the packet based network interface block and are delivered to the packet based network filter. The packet based network interface block translates the packet format as represented in the packet based network to an internal format that is used for all packet filter and routing functions within the residential gateway.

The packet based network filter accepts packets from the packet based network interface and makes a routing decision based on the destination address within the packet. The destination of the packet will typically be one of two possibilities: (1) VoHN packets for the proxy gateway, or (2) data packets delivered directly to the DOCSIS interface.

The proxy gateway performs a translation function between the packets in the VoHN format to packets in the VoIP format. The specific translation is direction dependent. Packets arriving from the packet based network filter are translated to a VoIP format and delivered to the DOCSIS interface. Packets arriving from the DOCSIS packet filter are translated to a VoHN format and delivered to the packet based network interface.

As previously mentioned a home network typically utilizes telephone wiring and connecting jacks typically found in a home. The cable replacement system typically replaces a telephone line that would be utilized to couple a client device to the telephone wall jack. In an alternative Ethernet embodiment Ethernet cabling and interfaces provide the network protocols and interfaces that the wireless cable replacement replaces and interfaces to. The wireless cable replacement system utilizes dongles, devices that provide half of the wireless cable replacement function, to establish a series of wireless links.

Typically a wall dongle couples to, or is integral with a telephone wall jack. The wall dongle is in communication via a wireless link to a device dongle that is coupled to a data IO port of a client device. In the exemplary embodiment a Bluetooth transceiver provides the wireless coupling between dongles. A Bluetooth transceiver provides a robust wireless link between dongles that is typically immune to jammers and other interference. However, those skilled in the art will realize that transceivers built to accommodate other types of wireless transmission standards will provide equivalent functionality.

Figure 4:
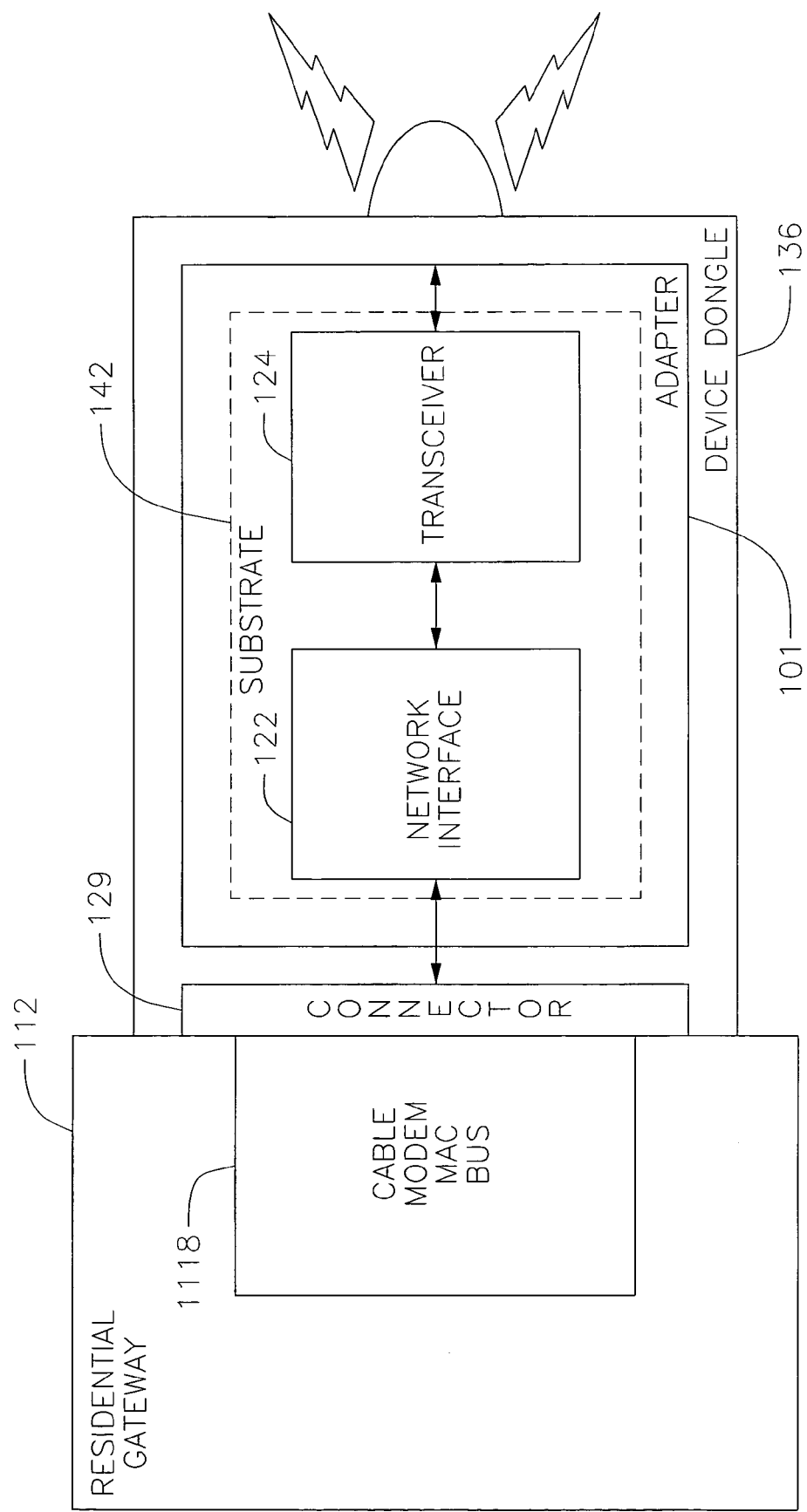
FIG. 4 is a block diagram of an adapter embodiment that interfaces with the exemplary cable modem MAC via the gateway bus.

FIG. 4 is a block diagram of an adapter embodiment that interfaces with the exemplary cable modem MAC via a gateway bus. A residential gateway 112, as previously described, includes a cable modem MAC bus 1118 of FIG. 2. Thus the cable modem MAC bus 1118 is coupled to a device dongle 136 via connector 129.

Device dongle 136 includes a connector 129 coupling signals to an adapter 101. The adapter 101 includes a network interface 122 coupled to a transceiver 124 and are both disposed on a substrate 142. Wireless signals are received and transmitted by transceiver 124. Transceiver 124 is coupled to network interface 122. Network interface 122 reformats packetized data being transferred between the cable modem MAC bus 1118 and the transceiver 124 such that the transceiver may communicate with the gateway. Reformatting of the data is accomplished by conventional circuitry known to those skilled in the art. In the exemplary embodiment, the network interface 122 includes conventional circuitry for converting a Bluetooth radio signal to a format compatible with the cable modem MAC bus.

Figure 5:
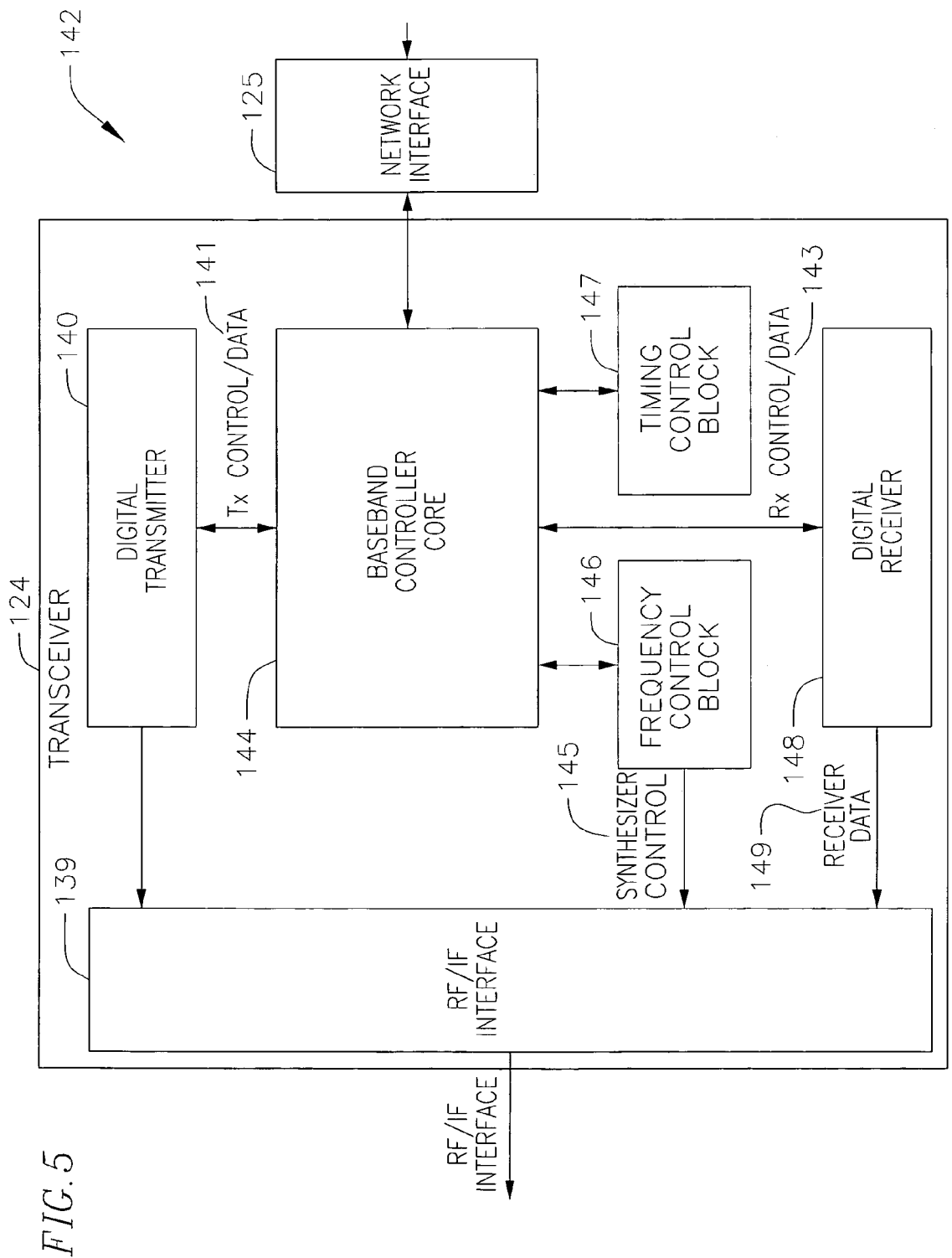
FIG. 5 is a block diagram of a transceiver and network interface.

FIG. 5 is a block diagram of a transceiver and network interface. An RF/IF interface connection is typically provided to an antenna (not shown) by an RF/IF interface 139. RF/IF interface 139 is typically provided by a RF transceiver. In an exemplary embodiment, the RF/IF interface 139 is provided by a Bluetooth transceiver.

The RF/IF interface is coupled to a conventionally constructed digital transmitter 140 and to a conventionally constructed digital receiver 148 via receiver data line 149. A synthesizer control line 145 couples the RF/IF interface 139 to a conventionally constructed frequency control block 146. The frequency control block is in turn coupled to a conventionally constructed base band controller core 144.

The base band controller core 144 is coupled to the digital transmitter 140 via Tx control/data line 141. The digital receiver 148 is coupled to the base band controller core 144 via Rx control/data line 143. The base band controller core 144 is coupled to a conventionally constructed timing control block 147 and to the network interface 125.

A transceiver embodiment that functions in compliance with the Bluetooth transmission standard, is suitable for integration onto a single CMOS substrate, and functions as the exemplary RF/IF interface (139 of FIG. 5) is described in the following paragraphs. The transceiver is typically integrated onto the CMOS substrate with the network interface. Although a CMOS circuit is described, those skilled in the art will realize that other equivalent integrated circuit technologies may be utilized.

In accordance with an exemplary embodiment of the present invention, a transceiver utilizes a combination of frequency planning, circuit design, layout and implementation, differential signal paths, dynamic calibration, and self-tuning to achieve robust performance over process variation and interference. This approach allows for the full integration of the transceiver onto a single IC for a low cost, low power, reliable and more compact solution. This can be achieved by (1) moving external bulky and expensive image reject filters, channel select filters, and baluns onto the RF chip; (2) reducing the number of off-chip passive elements such as capacitors, inductors, and resistors by moving them onto the chip; and (3) integrating all the remaining components onto the chip. As those skilled in the art will appreciate, the described exemplary embodiments of the transceiver do not require integration into a single IC and may be implemented in a variety of ways including discrete hardware components.

Figure 6:
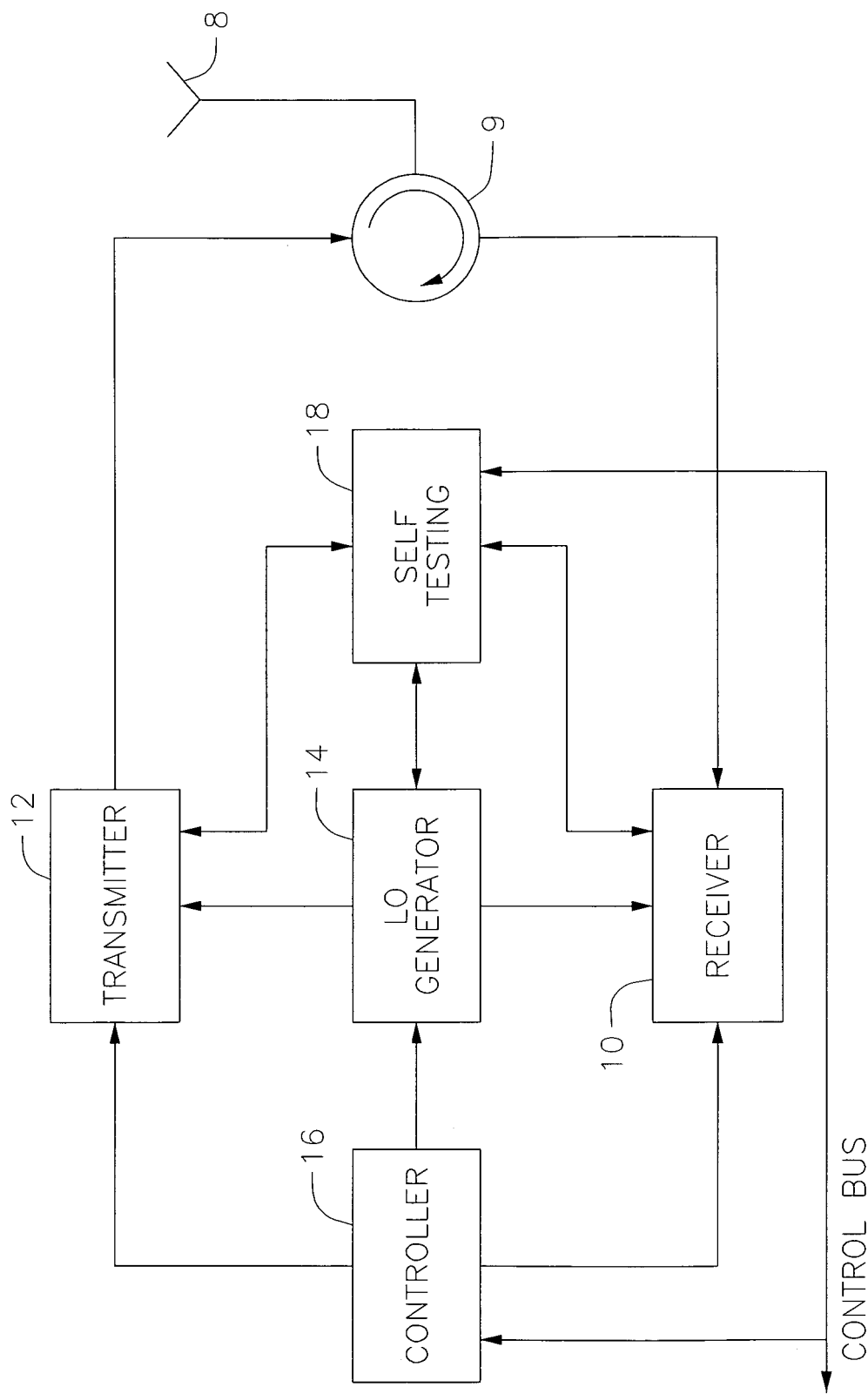
FIG. 6 is a block diagram of a transceiver in accordance with an exemplary embodiment of the present invention.

FIG. 6 is a block diagram of an exemplary embodiment of the transceiver including an antenna 8, a switch 9, a receiver 10, a transmitter 12, a local oscillator (LO) generator (also called a synthesizer) 14, a controller 16, and a self-testing unit 18. All of these components can be packaged for integration into a single IC including components such as filters and inductors.

The transceiver can operate in either a transmit or receive mode. In the transmit mode, the transmitter 12 is coupled to the antenna 8 through the switch 9. The switch 9 provides sufficient isolation to prevent transmitter leakage from desensitizing or damaging the receiver 10. In the receive mode, the switch 9 directs signal transmissions from the antenna 8 to the receiver 10. The position of the switch 9 can be controlled by an external device (not shown) such as a computer or any other processing device known in the art.

The receiver 10 provides detection of desired signals in the presence of noise and interference. It should be able extract the desired signals and amplify it to a level where information contained in the received transmission can be processed. In the described exemplary embodiment, the receiver 10 is based on a heterodyne complex (I-Q) architecture with a programmable intermediate frequency (IF). The LO generator 14 provides a reference signal to the receiver 10 to downconvert the received transmission to the programmed IF.

A low IF heterodyne architecture is chosen over a direct conversion receiver because of the DC offset problem in direct conversion architectures. DC offset in direct conversion architectures arises from a number of sources including impedance mismatches, variations in threshold voltages due to process variations, and leakage from the LO generator to the receiver. With a low IF architecture, AC coupling between the IF stages can be used to remove the DC offset.

The transmitter 12 modulates incoming data onto a carrier frequency. The modulated carrier is upconverted by the reference signal from the LO generator 14 and amplified to a sufficient power level for radiation into free space through the antenna 8. The transmitter uses a direct conversion architecture. With this approach only one step of upconversion is required This leads to a reduction in both circuit complexity and power consumption.

The controller 16 performs two functions. The first function provides for adaptive programming of the receiver 10, transmitter 14 and LO generator 16. By way of example, the transceiver can be programmed to handle various communication standards for local area networks (LAN) and personal area networks (PAN) including HomeRF, IEEE 802.11, Bluetooth, or any other wireless standard known in the art. This entails programming the transceiver to handle different modulation schemes and data rates. The described exemplary embodiment of the transceiver can support modulation schemes such as Binary Phase Shift Keying (BPSK), Quadrature Phase Shift Keying (QPSK), offset quadrature phase shift keying (OQPSK), Multiple frequency modulations such as M level frequency shift keying (FSK), Continuous Phase Frequency Shift Keying modulation (CFSK), Minimum Shift Keying modulation (MSK), Gaussian filtered FSK modulation (GFSK), and Gaussian filtered Minimum Shift Keying modulation (GMSK), Phase/Amplitude modulation (such as Quadrature Amplitude Modulation (QAM)), orthogonal frequency modulation (such as Orthogonal Frequency Division Multiplexing (OFDM)), direct sequence spread spectrum systems, and frequency hopped spread spectrum systems and numerous other modulation schemes known in the art. Dynamic programming of the transceiver can also be used to provide optimal operation in the presence of noise and interference. By way of example, the IF can be programmed to avoid interference from an external source.

The second function provides for adaptive calibration of the receiver 10, transmitter 14 and LO generator 16. The calibration functionality controls the parameters of the transceiver to account for process and temperature variations that impact performance. By way of example, resistors can be calibrated within exacting tolerances despite process variations in the chip fabrication process. These exacting tolerances can be maintained in the presence of temperature changes by adaptively fine tuning the calibration of the resistors.

The controller 16 can be controlled externally by a central processing unit (CPU), a microprocessor, a digital signal processor (DSP), a computer, or any other processing device known in the art. In the described exemplary embodiment, a control bus 17 provides two way communication between the controller 16 and the external processing device (not shown). This communication link can be used to externally program the transceiver parameters for different modulation schemes, data rates and IF operating frequencies. The output of the controller 16 is used to adjust the parameters of the transceiver to achieve optimal performance in the presence of process and temperature variations for the selected modulation scheme, data rate and IF.

The self-testing unit 18 generates test signals with different amplitudes and frequency ranges. The test signals are coupled to the receiver 10, transmitter 12 and LO generator 14 where they are processed and returned to the self-testing unit 18. The return signals are used to determine the gain, frequency characteristics, selectivity, noise floor, and distortion behavior of the receiver 10, transmitter 12 and LO generator 14. This is accomplished by measuring the strength of the signals output from the self-testing unit 18 against the returned signals over the tested frequency ranges. In an exemplary embodiment of the self-testing unit 18, these measurements can be made with different transceiver parameters by sweeping the output of the controller 16 through its entire calibrating digital range, or alternatively making measurements with the controller output set to a selected few points, by way of example, at the opposite ends of the digital range.

In the described exemplary embodiment, the self-testing unit 18 is in communication with the external processing device (not shown) via the control bus 17. During self-test, the external processing device provides programming data to both the controller 16 and the self-testing unit 18. The self-testing unit 18 utilizes the programming data used by the controller 16 to set the parameters of the transceiver to determine the gain, frequency characteristics, selectivity, noise floor, and distortion behavior of the receiver 10, transmitter 12 and LO generator 14.

Figure 7:
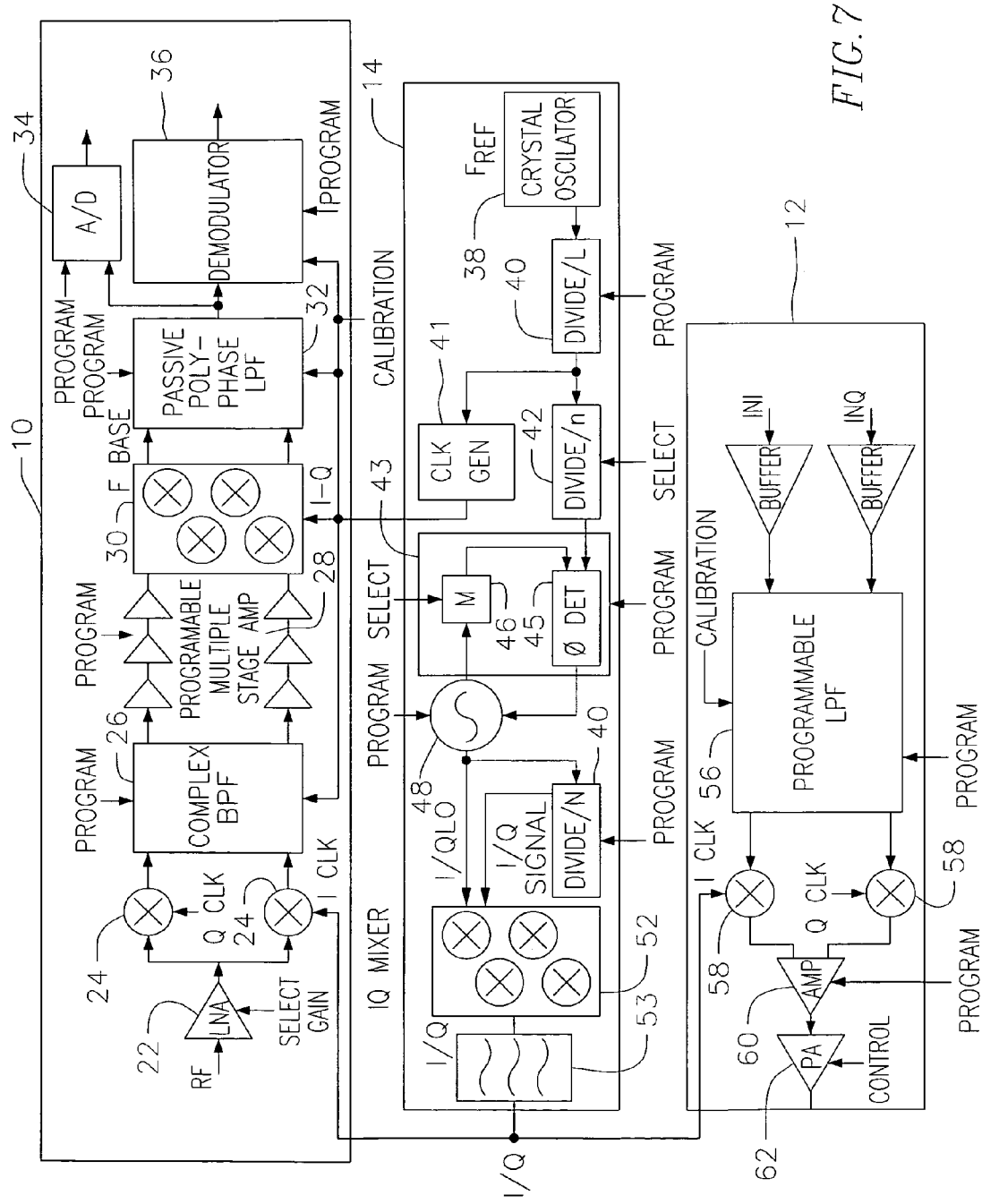
FIG. 7 is a block diagram of the transceiver blocks including a receiver, transmitter and local oscillator in accordance with an exemplary embodiment of the present invention.

FIG. 7 shows a block diagram of the transceiver in accordance with an embodiment of the invention. The described exemplary embodiment is integrated into a single IC. For ease of understanding, each component coupled to the controller is shown with a "program" designation or a "calibration" designation. These designations indicate whether the component is programmed by the controller or calibrated by the controller. In practice, in accordance with the described exemplary embodiment of the present invention, the components that are programmed receive the MSBs and the components that are calibrated receive the LSBs. The components requiring both programming and calibration receive the entire digital output from the controller. As those skilled in the art will appreciate, any number of methodologies may be used to deliver programming and calibration information to the individual components. By way of example, a single controller bus could be used having the programming and or calibration data with the appropriate component addresses.

The receiver 10 front end includes a low noise amplifier (LNA) 22 which provides high gain with good noise figure performance. Preferably, the gain of the LNA 22 can be set by the controller (not shown) through a "select gain" input to maximize the receivers dynamic range. The desirability of dynamic gain control arises from the effect of blockers or interferers which can desensitize the LNA. Conventional filter designs at the input of the LNA 22 may serve to sufficiently attenuate undesired signals below a certain power level, however, for higher power blockers or interferers, the LNA 22 should be operated with low gain.

The output of the LNA 22 is downconverted to a low IF frequency by the combination of complex IF mixers 24 and a complex bandpass filter 26. More particularly, the output of the LNA 22 is coupled to the complex IF mixers 24 which generate a spectrum of frequencies based upon the sum and difference of the received signal and the RF clocks from the LO generator. The complex bandpass filter passes the complex IF signal while rejecting the image of the received signal. The image rejection capability of the complex IF mixers 24 in cooperation with the complex bandpass filter 26 eliminates the need for the costly and power consuming preselect filter typically required at the input of the LNA for conventional low IF architectures.

The output of the complex bandpass filter 26 is coupled to a programmable multiple gain stage amplifier 28. The amplifier 28 can be designed to be programmable to select between a limiter and an automatic gain control (AGC) feature, depending on the modulation scheme used in the transceiver. The limiting amplifier can be selected if the transceiver uses a constant envelope modulation such as FSK. AGC can be selected if the modulation is not a constant envelope, such as QAM. In addition, the bandwidth of the amplifier 28 can be changed by the controller to accommodate various data rates and modulation schemes.

The output of the amplifier 28 is coupled to a second set of complex IF mixers 30 where it is mixed with the IF clocks from the LO generator for the purpose of downconverting the complex IF signal to baseband. The complex IF mixers 30 not only reject the image of the complex IF signal, but also reduces some of the unwanted cross modulation spurious signals thereby relaxing the filtering requirements.

The complex baseband signal from the mixers 30 is coupled to a programmable passive polyphase filter within a programmable low pass filter 32. The programmable low pass filter 32 further filters out higher order cross modulation products. The polyphase filter can be centered at four times the IF frequency to notch out one of the major cross modulation products which results from the multiplication of the third harmonic of the IF signal with the IF clock. After the complex baseband signal is filtered, it either is passed through an analog-to-digital (A/D) converter 34 to be digitized or is passed to an analog demodulator 36. The analog demodulator 36 can be implemented to handle any number of different modulation schemes by way of example FSK. Embodiments of the present invention with an FSK demodulator uses the A/D converter 36 to sample baseband data with other modulation schemes for digital demodulation in a digital signal processor (not shown).

The LO generator 14 provides the infrastructure for frequency planning. The LO generator 14 includes an IF clock generator 44 and an RF clock generator 47. The IF clock generator includes an oscillator 38 operating at a ratio of the RF signal (fOCS). High stability and accuracy can be achieved in a number of ways including the use of a crystal oscillator.

The reference frequency output from the oscillator 38 is coupled to a divider 40. The divider 40 divides the reference signal fOSC by a number L to generate the IF clocks for downconverting the complex IF signal in the receiver to baseband. A clock generator 41 is positioned at the output of the divider 40 to generate a quadrature sinusoidal signal from the square wave output of the divider 40. Alternatively, the clock generator 41 can be located in the receiver. The divider 40 may be programmed by through the program input. This feature allows changes in the IF frequency to avoid interference from an external source.

The output of the divider 40 is coupled to the RF clock generator 47 where it is further divided by a number n by a second divider 42. The output of the second divider 42 provides a reference frequency to a phase lock loop (PLL) 43. The PLL includes a phase detector 45, a divide by M circuit 46 and a voltage controlled oscillator (VCO) 48. The output of the VCO 48 is fed back through the divide by M circuit 46 to the phase detector 45 where it is compared with the reference frequency. The phase detector 45 generates an error signal representative of the phase difference between the reference frequency and the output of the divide by M circuit 46. The error signal is fed back to the control input of the VCO 48 to adjust its output frequency fVCO until the VCO 48 locks to a frequency which is a multiple of the reference frequency. The VCO 48 may be programmed by setting M via the controller through the program input to the divide by M circuit 46. The programmability resolution of the VCO frequency fVCO is set by the reference frequency which also may be programmed by the controller through the program input of the divider 42.

In the described exemplary embodiment, the VCO frequency is sufficiently separated (in frequency) from the RF frequency generated by the transmitter 12 to prevent VCO pulling and injection lock of the VCO. Transmitter leakage can pull the VCO frequency toward the RF frequency and actually cause the VCO to lock to the RF signal if their frequencies are close to each other. The problem is exasperated if the gain and tuning range of the VCO is large. If the frequency of the RF clocks is fLO, then the VCO frequency can be defined as: fVCO=NfLO/(N+1). This methodology is implemented with a divide by N circuit 50 coupled to the output of the VCO 48 in the PLL 43. The output of the VCO 48 and the output of the divide by N circuit 50 are coupled to a complex mixer 52 where they are multiplied together to generate the RF clocks. A filter 53 can be positioned at the output of the complex mixer to remove the harmonics and any residual mixing images of the RF clocks. The divide by N circuit can be programmable via the controller through the select input.

For example, if N=2, then fVCO=(⅔)fLO, and if N=3, then fVCO=(¾) fLO.

A VCO frequency set at ⅔ the frequency of the RF clocks works well in the described exemplary embodiment because the transmitter output is sufficiently separated (in frequency) from the VCO frequency. In addition, the frequency of the RF clocks is high enough so that its harmonics and any residual mixing images such as fVCO×1−(1/N)), 3fVCO× 1+(1/N), and 3fVCO×1−(1/N)) are sufficiently separated (in frequency) from the transmitter output to relax the filtering requirements of the RF clocks. The filtering requirements do not have to be sharp because the filter can better distinguish between the harmonics and the residual images when they are separated in frequency. Programming the divide by N circuit 50 also provides for the quadrature outputs of the divide by N circuit. Otherwise, with an odd number programmed, the outputs of the divide by N circuit 50 would not be quadrature. For an odd number, the divider 50 outputs will be differential, but will not be 90 degrees out of phase, i.e., will not be I-Q signals.

In the described exemplary embodiment, the RF clocks are generated in the in the LO generator 14. This can be accomplished in various fashions including, by way of example, either generating the RF clocks in the VCO or using a polyphase circuit to generate the RF clocks. Regardless of the manner in which the RF clocks are generated, the mixer 52 will produce a spectrum of frequencies including the sum and difference frequencies, specifically, fVCO×(1+(1/N)) and its image fVCO×(1−(1/N)). To reject the image, the mixer 52 can be configured as a double quadrature mixer as depicted in FIG. 3. The double quadrature mixer includes one pair of mixers 55, 57 to generate the Q-clock and a second pair of mixers 59, 61 to generate the I-clock. The Q-clock mixers utilizes a first mixer 55 to mix the I output of the VCO 48 (see FIG. 2) with the Q output of the divider 40 and a second mixer 57 to mix the Q output of the VCO with the I output of the divider. The outputs of the first and second mixers are connected together to generate the Q-clock. Similarly, the I-clock mixers utilizes a first mixer 59 to mix the I output of the divider with the Q output of the VCO and a second mixer 61 to mix the Q output of the divider with the I output of the VCO. The outputs of the first and second mixers are connected together to generate the I-clock. This technique provides very accurate I-Q clocks by combination of quadrature VCO and filtering. Because of the quadrature mixing, the accuracy of the I-Q clocks is not affected by the VCO inaccuracy, provided that the divide by N circuit generates quadrature outputs. This happens for even divide ratios, such as N=2.

Optimized performance is achieved through frequency planning and implemented by programmable dividers in the LO generator to select different ratios. Based on FIG. 7, all the dependencies of the frequencies are shown by the following equation:

$$fLO=fRF-(M\times fOSC/nL)(1+1/N)=fOSC/L$$

where fRF is frequency of the transmitter output

Turning back to FIG. 7, the transmitter 12 includes a complex buffer 54 for coupling incoming I-Q modulated baseband signals to a programmable low-pass filter 56. The low-pass filter 56 can be programmed by the controller through the select input. The output of the low-pass filter 56 is coupled to complex mixers 58. The complex mixers 58 mixes the I-Q modulated baseband signals with the RF clocks from the LO generator to directly upconvert the baseband signals to the transmitting frequency. The upconverted signal is then coupled to an amplifier 60 and eventually a power amplifier (PA) 62 for transmission into free space through the antenna. A bandpass filter (not shown) may be disposed after the PA 62 to filter out unwanted frequencies before transmission through the antenna.

In the described exemplary embodiment, the transmitter can be configured to minimize spurious transmissions. Spurious transmissions in a direct conversion transmitter are generated mainly because of the nonlinearity of the complex mixers and the DC offsets at the input to the complex mixers. Accordingly, the complex mixers can be designed to meet a specified IIP3 (Input Intercept Point for the 3rd Harmonic) for the maximum allowable spurs over the frequency spectrum of the communications standard. The DC offsets at the input to the complex mixers can be controlled by the physical size of the transistors.

In addition, the transmitter can be designed to minimize spurious transmission outside the frequency spectrum of the communications standard set by the FCC. There are two sources for these spurs: the LO generator and the transmitter. These spurs can be are suppressed by multiple filtering stages in the LO generator and transmitter. Specifically, in the LO generator, due to the complex mixing of the VCO signal with the output of the divide by N circuit, all the spurs are at least fVCO/N away from the RF clocks. By setting N to 2, by way of example, these unwanted spurs will be sufficiently separated (in frequency) from the transmitted signal and are easily removed by conventional filters in the LO generator and transmitter. Thus, the spurs will be mainly limited to the harmonics of the transmitted signal, which are also sufficiently separated (in frequency) from the transmitted signal, and therefore, can be rejected with conventional filtering techniques. For further reduction in spurs, a dielectric filter may be placed after the PA in the transmitter.

The transceiver embodiment presented is described in more detail in co-pending U.S. application Ser. No. 09/695,715 entitled "Adaptive Transceiver," filed Oct. 23, 2000. The disclosure thereof is incorporated herein in its entirety by reference.

Figure 8:
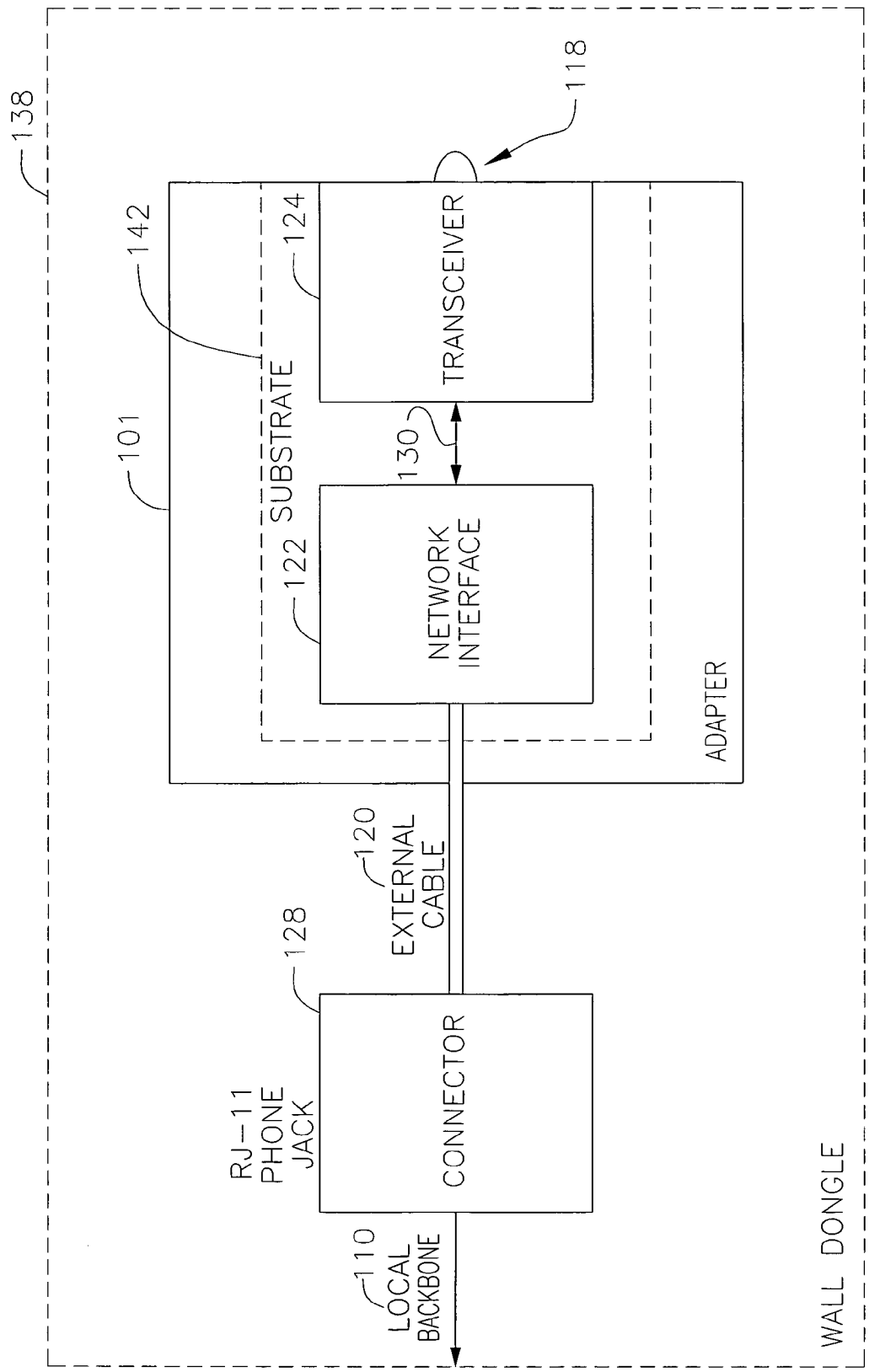
FIG. 8 is a block diagram of a wall dongle.

FIG. 8 is block diagram of a wall dongle. The wall dongle 138 provides a means of coupling the adapter 101 to the local backbone 110. In an exemplary embodiment, a local backbone connection 110 is available through a telephone wall jack (not shown). This connection is typically provided through an RJ-11 type phone jack. Connector 128, an RJ-11 phone plug in the exemplary embodiment, couples an external cable 120 to the local backbone 110. External cable 120 is coupled to a conventionally constructed network interface 122 which is in turn coupled via connection 130 to a transceiver 124, including an emitter 118 utilized for transmitting and receiving over the wireless link.

The network interface 122 and transceiver 124 are typically integrated onto a substrate 142. In the described embodiment the substrate is CMOS. However, alternative embodiments include differing substrates other than silicon fabricated by the CMOS process. Also, differing processes known to those skilled in the art may be used insteas of the exemplary CMOS. In an alternative embodiment, network interface 122 and transceiver 124 are not disposed on a common substrate.

Figure 9:
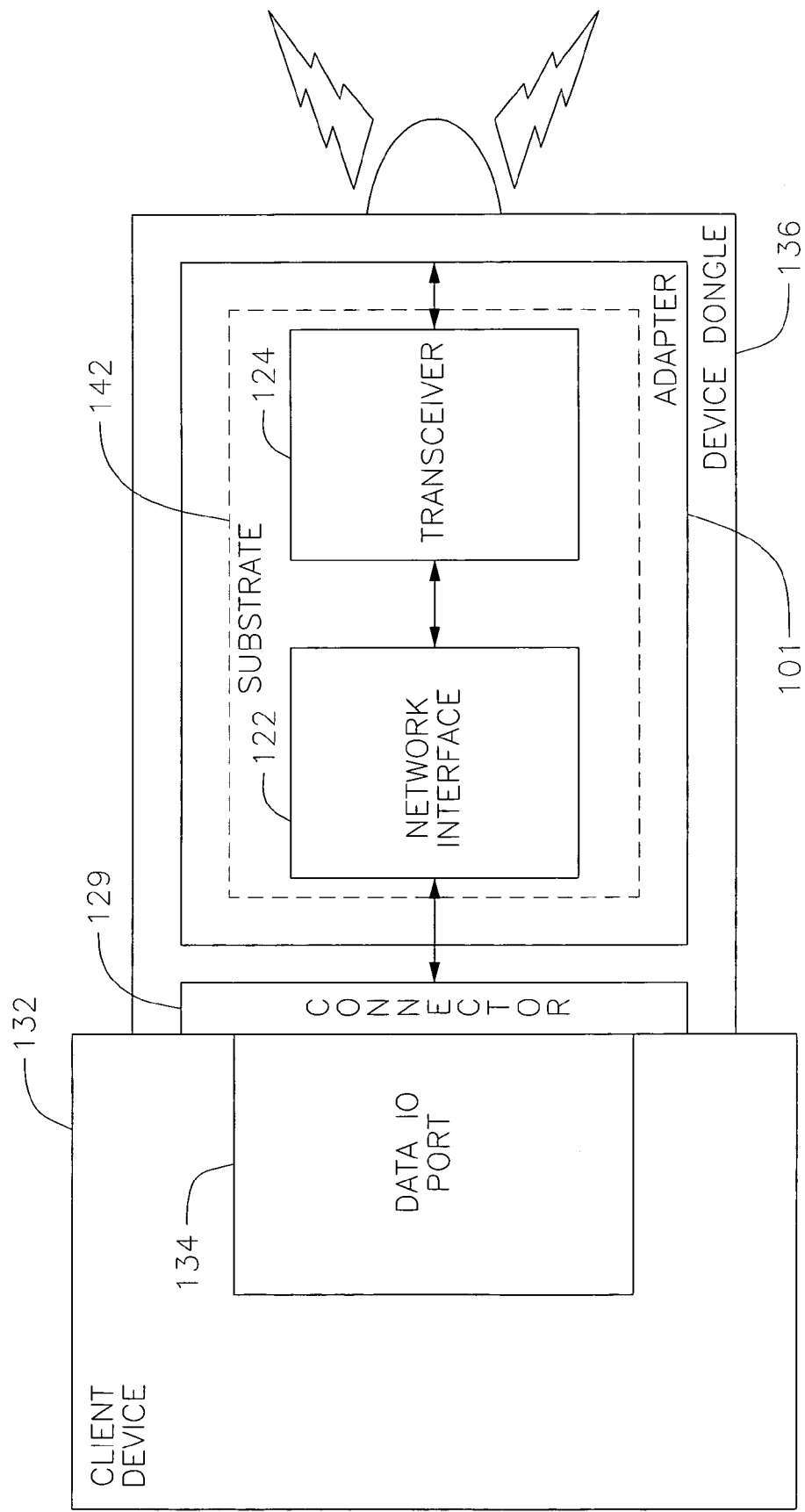
FIG. 9 is a block diagram of a device dongle.

FIG. 9 is a block diagram of a device dongle. A device dongle 136 provides the second half to the wireless cable replacement system. The device dongle 136 is coupled to the wall dongle 138 through a wireless coupling mechanism. The wireless coupling mechanism includes radio frequency coupling, and in an alternative embodiment infrared coupling.

A client device 132 typically includes a data I/O port 134 typically providing data formatted in an Ethernet or Home-PNA format utilized by the Intranet via the local backbone connections. A connector 129 included in device dongle 136 is coupled to data I/O port 134 to transfer data formatted according to the client device's architecture, to a network interface 122. A conventionally constructed network interface 122 converts the data supplied by the data I/O port 134 into a format suitable for presentation to transceiver 124.

In the described embodiments the network interfaces utilize conventionally constructed circuitry to reformat a given data type, present on the Intranet or at the gateway, to data suitable for transmission via a Bluetooth compatible transceiver. Several data types present on the Intranet, or at the gateway, include PNA, ADSL, Ethernet and IDSL.

Typically the network interface 122 and the transceiver 124 are disposed on a common substrate 142. However, in an alternative embodiment, the network interface 122 and the transceiver 124 may be disposed on differing substrates.

Figure 10:
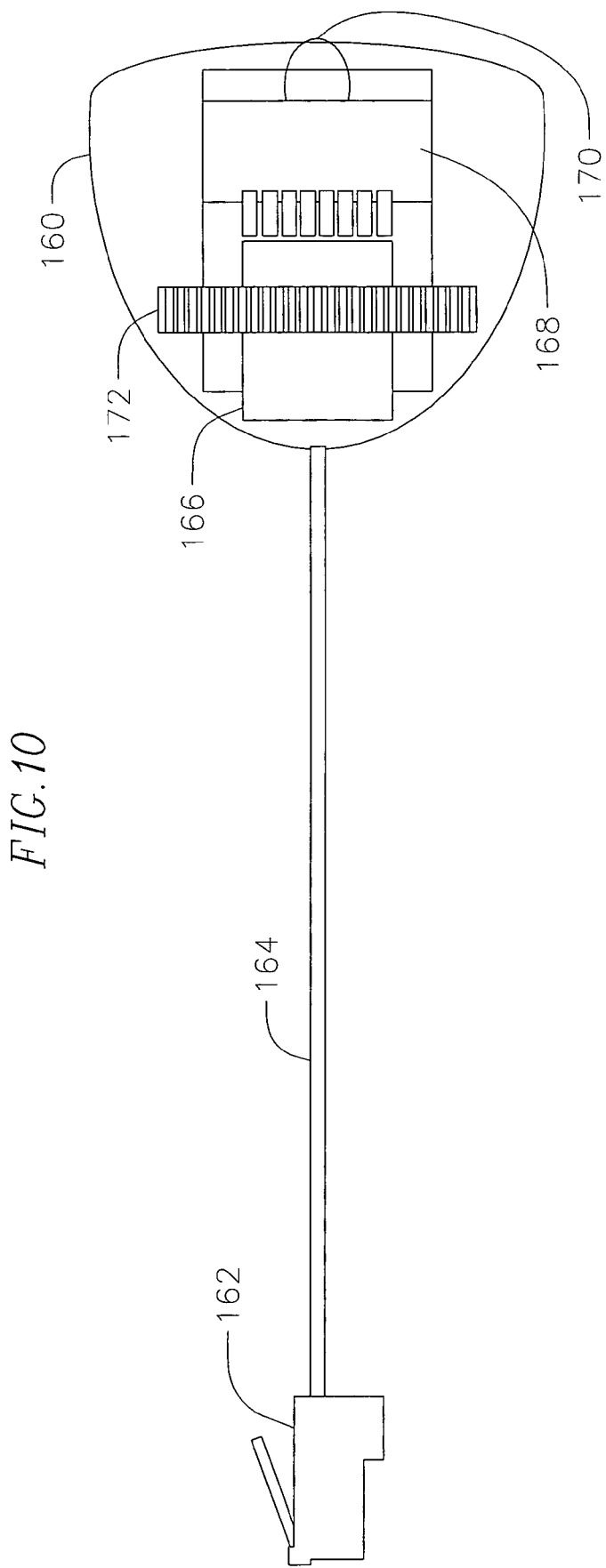
FIG. 10 is a representation of the physical construction of a dongle.

FIG. 10 illustrates the physical construction of an exemplary dongle. The dongle can be designed for interchangeable use in either the wall or the device. The dongle has high density packaging with a light weight construction for ease of use. The dongle includes a transceiver housing 160 formed of a suitably sturdy material. The transceiver housing 160 is coupled to a connector 1162 with a short cable 164. Various connector can be employed to support numerous applications. By way of example, an RJ-45 connector can be used to access an Ethernet device or Ethernet backbone depending on whether the dongle is used as a device dongle or wall dongle. Alternatively, an RJ-11 connector can be used to access a telephony device, computer, or appliance when used as a device dongle or an HPNA backbone when used as a wall dongle. Those skilled in the art will appreciate that other connectors can be used to support other wireless applications.

The transceiver housing 160 provides an enclosure for a network interface 166 positioned rearwardly for easy coupling to the short cable 164. Forward of the network interface 166 is a bluetooth transceiver 168. The bluetooth transceiver 168 includes an antenna 170 which protrudes from the forward end of the transceiver housing 160 in manner which optimizes reception and transmission coverage. The bluetooth transceiver 168 and the network interface 166 can be powered from a variety of sources and may receive supplemental power from a solar panel 172 positioned within the transceiver housing 160.

Although a preferred embodiment of the present invention has been described, it should not be construed to limit the scope of the appended claims. Those skilled in the art will understand that various modifications may be made to the described embodiments. Moreover, to those skilled in the various arts, the invention itself herein will suggest solutions to other tasks and adaptations for other applications. It is therefore desired that the present embodiments be considered in all respects as illustrative and not restrictive, reference being made to the appended claims rather than the foregoing description to indicate the scope of the invention.

The invention claimed is:

1. A personal area network, comprising:
    a device having a first complementary metal-oxide semiconductor (CMOS) wireless transceiver; and
    an adapter having a second CMOS wireless transceiver in communication with the first CMOS wireless transceiver, a connector capable of mating to a local cable-based network backbone, and an interface adapted to facilitate communication between the second CMOS wireless transceiver and the local backbone.

2. The personal area network of claim 1 wherein the first and second CMOS wireless transceivers each comprises a Bluetooth transceiver.

3. The personal area network of claim 1 wherein the interface provides an interface between the second CMOS wireless transceiver and the local backbone comprising a packet based network.

4. The personal area network of claim 3 wherein the interface provides an interface between the second CMOS wireless transceiver and the packet based network comprising a twisted pair telephone line.

5. The personal area network of claim 4 wherein the interface provides an interface between the second CMOS wireless transceiver and the packet based network using a protocol for home communications over a twisted pair telephone line.

6. The personal area network of claim 4 wherein the interface provides an interface between the second CMOS wireless transceiver and the packet based network comprising an Ethernet line.

7. The personal area network of claim 4 wherein the interface provides an interface between the second CMOS wireless transceiver and the packet based network comprising a digital subscriber line.

8. The personal area network of claim 1 wherein the device comprises a telephony device.

9. The personal area network of claim 8 wherein the telephony device comprises a telephone.

10. The personal area network of claim 9 further comprising a second telephone having a third CMOS wireless transceiver in communication with the second CMOS wireless transceiver.

11. The personal area network of claim 10 further comprising a computer having a fourth CMOS wireless transceiver in communication with the second CMOS wireless transceiver, and an appliance having a fifth CMOS wireless transceiver in communication with the second CMOS wireless transceiver.

12. The personal area network of claim 8 wherein the device comprises a computer.

13. The personal area network of claim 12 further comprising a second computer having a third CMOS wireless transceiver in communication with the second CMOS wireless transceiver.

14. The personal area network of claim 8 wherein the device comprises an appliance.

15. The personal area network of claim 14 further comprising a second appliance having a third wireless transceiver in communication with the second wireless transceiver.

16. A wall dongle, comprising:
    a wireless transceiver;
    a plug capable of mating to a jack coupled to a local cable-based network backbone; and
    an interface coupled to the plug and to the wireless transceiver, and adapted to facilitate communication between the wireless transceiver and the local backbone.

17. The wall dongle of claim 16 wherein the wireless transceiver comprises a Bluetooth transceiver.

18. The wall dongle of claim 16 wherein the interface provides an interface between the wireless transceiver and the local backbone comprising a packet based network.

19. The wall dongle of claim 18 wherein the interface provides an interface between the wireless transceiver and the packet based network comprising a twisted pair telephone line.

20. The wall dongle of claim 19 wherein the interface provides an interface between the wireless transceiver and the packet based network using a protocol for home communications over a twisted pair telephone line.

21. The wall dongle of claim 18 wherein the interface provides an interface between the wireless transceiver and the packet based network comprising an Ethernet line.

22. The wall dongle of claim 18 wherein the interface provides an interface between the second wireless transceiver and the packet based network comprising a digital subscriber line.

23. The wall dongle of claim 16 wherein the plug is adapted to mate to an RJ-11 telephone jack.

24. The wall dongle of claim 16 wherein the plug is adapted to mate to an RJ-45 Ethernet jack.

25. The wall dongle of claim 16 wherein the interface and wireless transceiver each comprises CMOS.

26. The wall dongle of claim 25 further comprising a substrate, the CMOS interface and wireless transceiver each being disposed on the substrate.

27. A method of interfacing a wireless communication medium to a local backbone, comprising:
using a wall dongle to exchange information with an external device over a wireless medium, the wall dongle having an adapter plugged into a jack coupled to a local cable-based network backbone, the adapter comprising a wireless transceiver and a network interface adapted to facilitate communication between the wireless transceiver and the local backbone; and
communicating at least a portion of the information between the wall dongle adapter and the local backbone.

28. The method of claim 27 network wherein the local backbone comprises a packet based network.

29. The method of claim 28 wherein the packet based network comprises a twisted pair telephone line.

30. The method of claim 29 wherein the communication between the second wireless transceiver and the packet based network comprises using a protocol for home communications over the twisted pair telephone line.

31. The method of claim 28 wherein the packet based network comprises an Ethernet line.

32. The method of claim 28 wherein the packet based network comprises a digital subscriber line.

33. A device dongle, comprising:
a wireless transceiver;
a plug capable of mating to a jack coupled to a device;
an interface coupled to the plug and to the wireless transceiver, and adapted to facilitate communication between the wireless transceiver and the device; and
a housing enclosing the wireless transceiver and the interface.

34. The device dongle of claim 33 wherein the wireless transceiver comprises a Bluetooth transceiver.

35. The device dongle of claim 33 wherein the interface provides an interface between the wireless transceiver and the device comprising a telephone.

36. The device dongle of claim 33 wherein the interface provides an interface between the wireless transceiver and the device comprising a computer.

37. The device dongle of claim 33 wherein the interface provides an interface between the wireless transceiver and the device comprising an appliance.

38. The device dongle of claim 33 wherein the plug is adapted to mate to an RJ-11 telephone jack.

39. The device dongle of claim 33 wherein the plug is adapted to mate to an RJ-45 Ethernet jack.

40. The device dongle of claim 33 wherein the interface and wireless transceiver each comprises CMOS.

41. The device dongle of claim 40 further comprising a substrate, the CMOS interface and wireless transceiver each being disposed on the substrate.

42. A method of interfacing a wireless communication medium to a device, comprising:
using a device dongle to exchange information with an external device over a wireless medium, the device dongle having an adapter plugged into a jack coupled to the device, the adapter being enclosed within a housing and comprising a wireless transceiver and a network interface adapted to facilitate communication between the wireless transceiver and the device; and
communicating at least a portion of the information between the device dongle and the device.

43. The method of claim 42 wherein the device comprises a telephone.

44. The method of claim 42 wherein the device comprises a computer.

45. The method of claim 42 wherein the device comprises an appliance.

46. A communications network, comprising:
a communication device;
a first dongle having a first wireless transceiver and a plug capable of mating to a jack coupled to the communication device;
a second dongle comprising a second wireless transceiver in communication with the first wireless transceiver and a plug capable of mating to a jack coupled to a local cable-based network backbone;
a local cable-based network backbone coupled to the second wireless transceiver; and
an Internet gateway coupled to the local backbone.

47. The communications network of claim 46 wherein the first and second wireless transceivers each comprises a Bluetooth transceiver.

48. The communications network of claim 46 wherein the local backbone comprising a packet based network.

49. The communications network of claim 48 wherein the packet based network comprising a twisted pair telephone line.

50. The communications network of claim 49 wherein the second wireless transceiver is in communication with the packet based network using a protocol for home communications over a twisted pair telephone line.

51. The communications network: of claim 48 wherein the packet based network comprising an Ethernet line.

52. The communications network of claim 48 wherein the packet based network comprising a digital subscriber line.

53. The communications network of claim 46 wherein the device comprises a telephony device.

54. The communications network of claim 53 wherein the telephony device comprises a telephone.

55. The communications network of claim 54 further comprising a second telephone having a third wireless transceiver in communication with the second wireless transceiver.

56. The communications network of claim 55 further comprising a computer having a fourth wireless transceiver in communication with the second wireless transceiver, and an appliance having a fifth wireless transceiver in communication with the second wireless transceiver.

57. The communications network of claim 46 wherein the device comprises a computer.

58. The communications network of claim 57 further comprising a second computer having a third wireless transceiver in communication with the second wireless transceiver.

59. The communications network of claim 46 wherein the device comprises an appliance.

60. The communications network of claim 59 further comprising a second appliance having a third wireless transceiver in communication with the second wireless transceiver.

61. The communications network of claim 46 wherein the Internet gateway comprises a cable modem.

62. A communications network, comprising:
a plurality of devices, each of which is connected to an adapter via a connector, wherein each adapter comprises a wireless transceiver;
a local backbone;
an access point to the local backbone, the access point being connected to an access adapter via a connector, wherein the access adapter comprises an access wireless transceiver in communication with the wireless transceiver for each of the adapters; and
an Internet gateway coupled to the local backbone.

63. The communications network of claim 62 wherein the wireless transceivers and the access wireless transceiver each comprises a Bluetooth transceiver, the local backbone comprises a twisted pair telephone line, and the Internet gateway comprises a cable modem.

64. The communications network of claim 63 wherein the devices comprise a plurality of telephones, a plurality of computers and a plurality of appliances.

65. A method of communication, comprising:
providing a device connected to a first adapter via a first connector, the first adapter comprising a first wireless transceiver;
providing an access point to a local backbone, the access point connected to a second adapter via a second connector, the second adapter comprising a second wireless transceiver;
exchanging information over a wireless medium between the device and the access point using the first and second wireless transceivers;
communicating at least a portion of the information between the access point and the local backbone; and
coupling the communicated information between the local backbone and an Internet gateway.

66. The method of claim 65 wherein the information exchange between the device and the access point comprises using a Bluetooth protocol.

67. The method of claim 65 wherein the local backbone comprises a packet based network.

68. The method of claim 67 wherein the packet based network comprises a twisted pair telephone line.

69. The method of claim 68 wherein the communication between the access point and the packet based network comprises using a protocol for home communications over the twisted pair telephone line.

70. The method of claim 67 wherein the packet based network comprises an Ethernet line.

71. The method of claim 67 wherein the packet based network comprises a digital subscriber line.

72. The method of claim 65 wherein the device comprises a telephony device.

73. The method of claim 72 wherein the telephony device comprises a telephone, and the information exchange between the first and second wireless transceivers comprises exchanging voice signals.

74. The method of claim 73 further comprising exchanging information between a second telephone and the access point, wherein the communication between the access point and the local backbone comprises communicating at least a portion of the exchanged information between the access point and each of the telephones.

75. The method of claim 73 further comprising exchanging information between a computer and the access point, and exchanging information between an appliance and the access point, wherein the communication between the access point and the local backbone comprises communicating at least a portion of the exchange information between the access point and each of the telephone, computer and appliance.

76. The method of claim 65 wherein the device comprises a computer.

77. The method of claim 76 further comprising exchanging information between a second computer and the access point, wherein the communication between the access point and the local backbone comprises communicating at least a portion of the exchanged information between the access point and each of the computers.

78. The method of claim 65 wherein the device comprises an appliance.

79. The method of claim 78 further comprising exchanging information between a second appliance and the access point, wherein the communication between the access point and the local backbone comprises communicating at least a portion of the exchanged information between the access point and each of the appliances.

80. The method of claim 65 wherein the Internet gateway comprises a cable modem.

81. The method of claim 27 wherein the information exchange comprises using a Bluetooth protocol.

82. The method of claim 42 wherein the information exchange comprises using a Bluetooth protocol.

* * * * *